United States Patent
Takagi et al.

(10) Patent No.: US 10,168,647 B2
(45) Date of Patent: Jan. 1, 2019

(54) FIXING DEVICE AND IMAGE FORMING APPARATUS INCLUDING HEAT INSULATING MEMBER IN CONTACT WITH BEARING

(71) Applicant: KYOCERA Document Solutions Inc., Osaka (JP)

(72) Inventors: Masaru Takagi, Osaka (JP); Tomohiko Yamakawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/793,361

(22) Filed: Oct. 25, 2017

(65) Prior Publication Data

US 2018/0150000 A1     May 31, 2018

(30) Foreign Application Priority Data

Nov. 30, 2016  (JP) ................................ 2016-232673

(51) Int. Cl.
| | |
|---|---|
| *F16C 13/02* | (2006.01) |
| *G03G 15/20* | (2006.01) |
| *F16C 37/00* | (2006.01) |

(52) U.S. Cl.
CPC ......... *G03G 15/2003* (2013.01); *F16C 13/02* (2013.01); *F16C 37/00* (2013.01); *G03G 15/2017* (2013.01); *G03G 15/2053* (2013.01); *G03G 15/2064* (2013.01)

(58) Field of Classification Search
CPC ......... F16C 13/02–13/04; F16C 17/243; F16C 33/72; F16C 41/002; F16C 17/026; F28F 5/02

USPC ................................................ 384/216, 277
See application file for complete search history.

(56) References Cited

U.S. PATENT DOCUMENTS

| | | | |
|---|---|---|---|
| 6,390,683 B1 * | 5/2002 | Hirose ................. | F16C 35/073 384/277 |
| 9,372,454 B2 * | 6/2016 | Matsuyama ....... | G03G 15/2053 |
| 2007/0048047 A1 * | 3/2007 | Matsuno ............ | G03G 15/2053 399/333 |
| 2007/0092311 A1 * | 4/2007 | Fujimoto ........... | G03G 15/2053 399/328 |

(Continued)

FOREIGN PATENT DOCUMENTS

| | | | |
|---|---|---|---|
| JP | 01105278 A | * | 4/1989 |
| JP | H06-337608 A | | 12/1994 |

*Primary Examiner* — Walter L Lindsay, Jr.
*Assistant Examiner* — Arlene Heredia
(74) *Attorney, Agent, or Firm* — Studebaker & Brackett PC

(57) ABSTRACT

A fixing device includes a cylindrical fixing member, a pressing member, a bearing and a heat insulating member. The fixing member is heated by a heat source. The pressing member forms a fixing nip between the pressing member and the fixing member. The bearing supports an end portion of the fixing member in a rotatable manner. The heat insulating member is interposed between the bearing and the end portion of the fixing member. The heat insulating member has a cylindrical part and a flange part. The cylindrical part has a slitting groove extending along an axis direction of the cylindrical part. The flange part extends outward in a radial direction of the cylindrical part from one end of the cylindrical part in the axis direction. At least one notch is formed along an outer circumferential edge of the flange part.

9 Claims, 7 Drawing Sheets

(56) References Cited

U.S. PATENT DOCUMENTS

| | | | |
|---|---|---|---|
| 2013/0315638 A1* | 11/2013 | Sawamura | G03G 15/2003 399/333 |
| 2014/0328684 A1* | 11/2014 | King | F04D 29/056 416/95 |
| 2015/0301485 A1* | 10/2015 | Yamakawa | G03G 15/2053 399/328 |
| 2017/0013790 A1* | 1/2017 | Devir | A01K 63/065 |

* cited by examiner

FIXING DEVICE AND IMAGE FORMING APPARATUS INCLUDING HEAT INSULATING MEMBER IN CONTACT WITH BEARING

INCORPORATION BY REFERENCE

This application is based on and claims the benefit of priority from Japanese Patent application No. 2016-232673 filed on Nov. 30, 2016, which is incorporated by reference in its entirety.

BACKGROUND

The present disclosure relates to a fixing device which fixes a toner image on a sheet and an image forming apparatus including the fixing device.

An image forming apparatus, such as a copying machine and a printer, is provided with a fixing device which fixes a toner image transferred on a sheet to the sheet. The fixing device includes a fixing roller heated by a heat source and a pressing roller which is pressed against the fixing roller to form a fixing nip between the fixing roller and the pressing roller. At the fixing nip, the toner image is heated and pressed to be fixed on the sheet.

Both end portions of the fixing roller are supported by bearings in a rotatable manner via heat insulating members. Because the fixing roller is heated by the heat source to a predetermined high temperature, the heat insulating member is made of high heat insulation material and prevents the heat from being transmitted to members disposed near the fixing roller.

The fixing roller rotates at a high speed during a fixing operation and at a row speed during a waiting period. When the fixing roller rotates, the heat insulating member and an inner ring of the bearing are rotated together with the fixing member. However, because a clearance is formed between the end portion of the fixing roller and the heat insulating member, the heat insulating member is sometimes slid with respect to the end portion of the fixing member. Then, an abnormal noise may be occurred owing to friction at the sliding. In this case, if the heat insulating member has a high rigidity in its circumferential direction and fastens the end portion of the fixing roller tightly, the friction becomes large and the abnormal noise may be easily occurred. Additionally, because an outer diameter of the end portion of the fixing roller is varied by heating and cooling of the fixing roller, the clearance between the end portion of the fixing roller and the heat insulating member may be varied.

Then, the heat insulating member is sometimes formed with a slitting groove extending in an axial direction of the heat insulating member. The slitting groove absorbs the outer diameter variation owing to expanding and shrinking of the fixing roller caused by the heating and cooling.

However, if the slitting groove is formed in the heat insulating member, it is difficult to lower the circumferential rigidity of the heat insulating member sufficiently and to prevent the abnormal noise occurred when the heat insulating member fastens the end portion of the fixing roller tightly. Additionally, if the heat insulating member is applied with a lubricant, such as a grease, a sliding performance of the heat insulating member may be improved. However, because of application irregularity or scattering of the grease, it is impossible to secure sufficient durability.

SUMMARY

In accordance with an aspect of the present disclosure, a fixing device includes a cylindrical fixing member, a pressing member, a bearing and a heat insulating member. The fixing member is heated by a heat source. The pressing member forms a fixing nip between the pressing member and the fixing member. The bearing supports an end portion of the fixing member in a rotatable manner. The heat insulating member is interposed between the bearing and the end portion of the fixing member. The heat insulating member has a cylindrical part and a flange part. The cylindrical part has a slitting groove extending along an axis direction of the cylindrical part. The flange part extends outward in a radial direction of the cylindrical part from one end of the cylindrical part in the axis direction. At least one notch is formed along an outer circumferential edge of the flange part.

In accordance with an aspect of the present disclosure, an image forming apparatus includes an image forming part and the above fixing device. The image forming part forms a toner image on a sheet. The fixing device fixes the toner image on the sheet.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the attached drawings, an image forming apparatus and a fixing device according to one embodiment of the present disclosure will be described.

Figure 1:
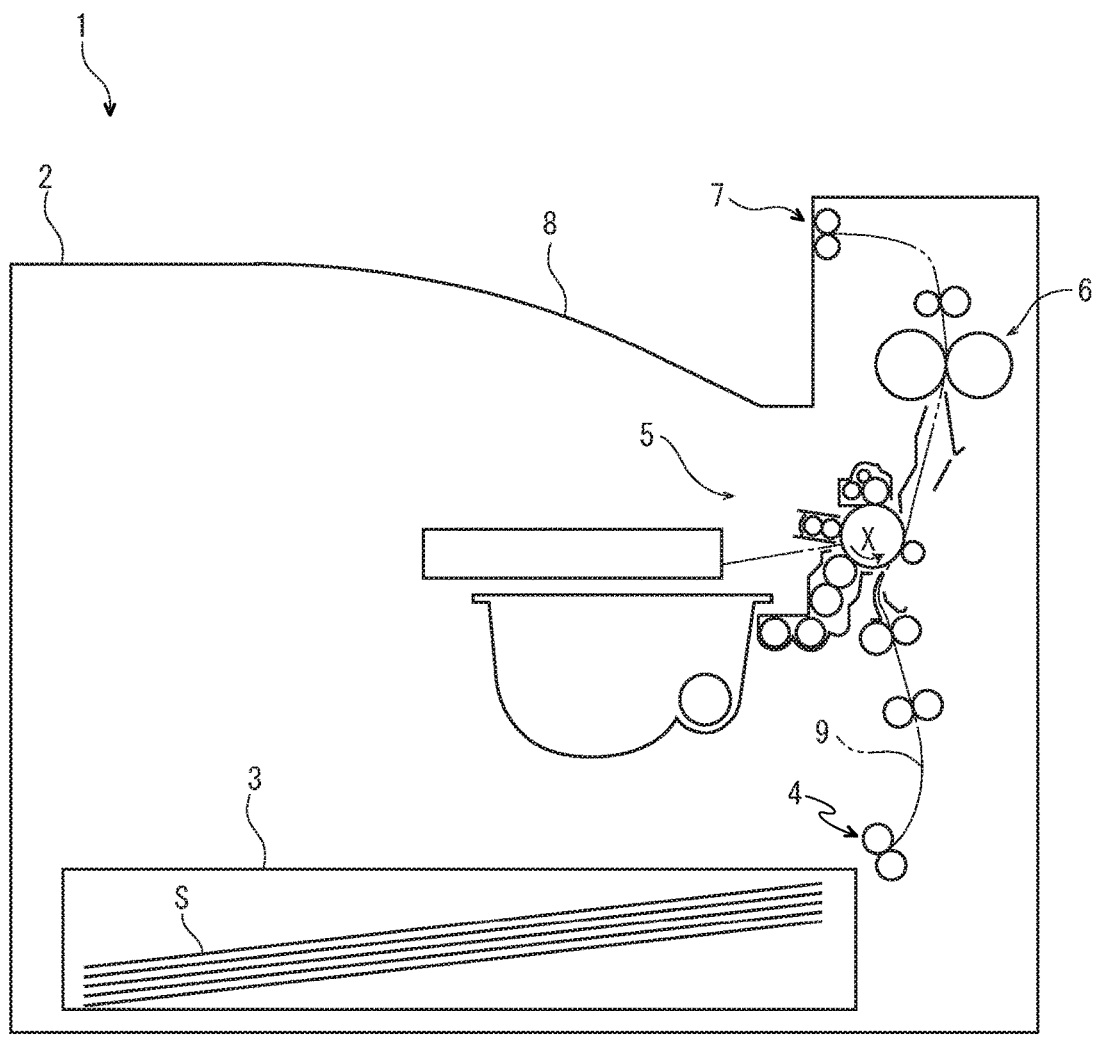
FIG. 1 is a front view schematically showing an inner structure of a printer according to one embodiment of the present disclosure.

With reference to FIG. 1, an entire structure of a printer 1 as an example of the image forming apparatus will be described. FIG. 1 is a view schematically showing an inner structure of the printer 1. In the following description, a near side of a paper plan of FIG. 1 is defined to be a front side of the printer 1, and a left-right direction is defined based on the direction in which the printer 1 is viewed from the front side. Fr, Rr, L and R shown in each figure respectively show the front, rear, left and right sides of the printer 1.

An apparatus main body 2 of the printer 1 includes a sheet feeding cassette 3 in which a sheet S is stored, a sheet feeding device 4 configured to feed the sheet S from the sheet feeding cassette 3, an image forming part 5 configured to form a toner image on the fed sheet S, a fixing device 6 configured to fix the toner image on the sheet S, a sheet ejecting device 7 configured to eject the sheet S and an ejected sheet tray 8 configured to receive the ejected sheet S. The apparatus main body 2 includes a conveying path 9 along which the sheet S is conveyed from the sheet feeding device 4 to the sheet ejecting device 7 through the image forming part 5 and the fixing device 6.

Figure 2:
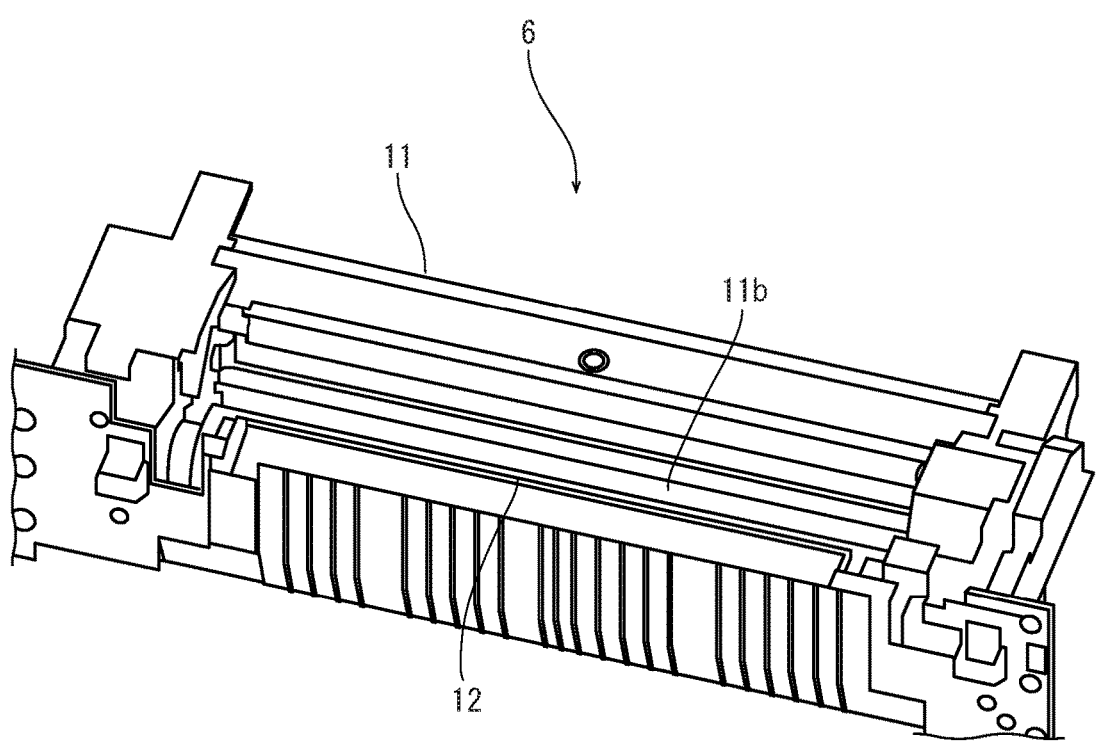
FIG. 2 is a perspective view showing a fixing device according to one embodiment of the present disclosure.

Next, with reference to FIG. 2 and FIG. 3, the fixing device 6 will be described. FIG. 2 is a perspective view showing the fixing device and FIG. 3 is a sectional view schematically showing the fixing device.

As showing in FIG. 2, the fixing device 6 includes a fixing housing 11, a fixing roller 12, a pressing roller 13 and a halogen heater 14. The fixing roller 12 as an example of a fixing member is supported by the fixing housing 11 in a rotatable manner. The pressing roller 13 as an example of pressing member which forms a fixing nip with the fixing roller 12 is stored in the fixing housing 11. The halogen heater 14 as an example of a heat source is stored in the fixing housing 11.

Figure 3:
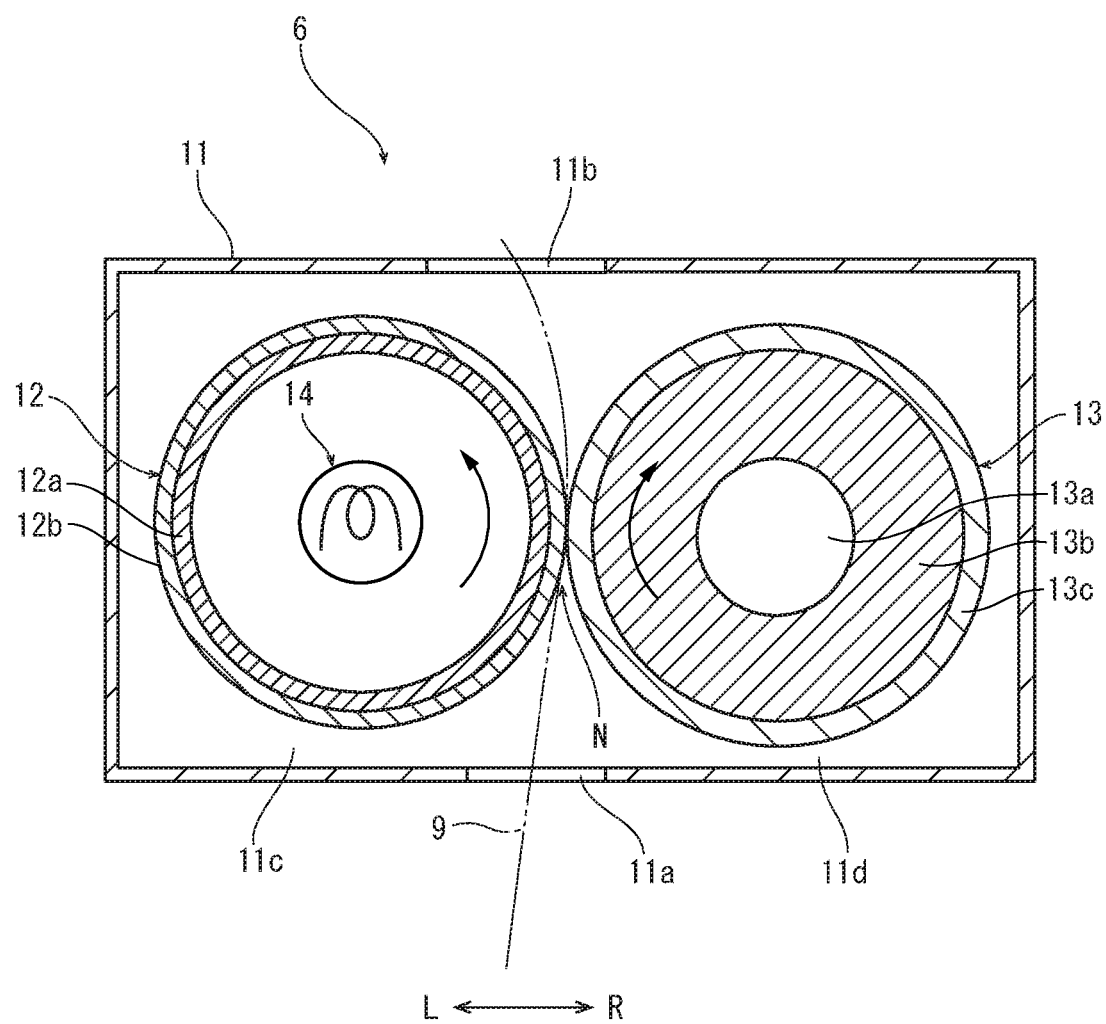
FIG. 3 is a sectional view showing the fixing device according to the embodiment of the present disclosure.

As shown in FIG. 3, on a lower face of the fixing housing 11, an inlet port 11a through which the sheet S is introduced is formed along a width direction perpendicular to a conveying direction of the sheet S. On an upper face of the fixing housing 11, an outlet port 11b through which the sheet S is discharged is formed along the width direction. From the inlet port 11a to the outlet port 11b, the conveying path 9 is extended. Inside the fixing housing 11, a fixing roller storage recess 11c and a pressing roller storage recess 11d are formed on the left side and the right side of the conveying path 9, respectively.

The fixing roller 12 has a cylindrical core metal 12a and a releasing layer 12b provided around an outer circumferential face of the core metal 12a via an adhesion layer. The fixing roller 12 is supported by the fixing roller storage recess 11c of the fixing housing 11 in a rotatable manner.

The pressing roller 13 has a rotating shaft 13a, an elastic layer 13b provided around an outer circumferential face of the rotating shaft 13a and a releasing layer 13c provided around an outer circumferential face of the elastic layer 13b via an adhesion layer. The pressing roller 13 is supported by the pressing roller storage recess 11d of the fixing housing 11 in a rotatable manner. The pressing roller 13 is pressed against the fixing roller 12 to form a fixing nip N between the rollers 12 and 13.

The halogen heater 14 is disposed in an inner hollow space of the fixing roller 12. The halogen heater 14 radiates heat to an inner circumferential face of the fixing roller 12 to heat the fixing roller 12.

Figure 4:
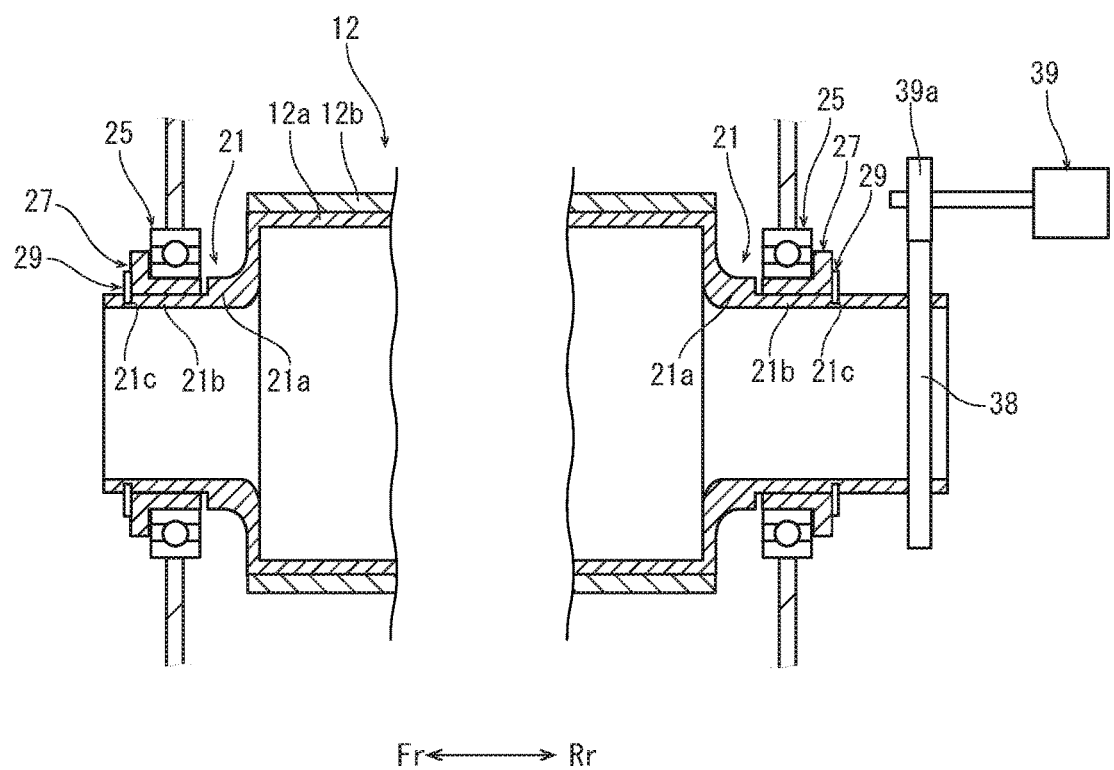
FIG. 4 is a sectional view showing a fixing roller of the fixing device according to the embodiment of the present disclosure.

Next, the fixing roller 12 will be further described with reference to FIG. 4 and FIG. 5. FIG. 4 is s side sectional view showing the fixing roller and FIG. 5 is a perspective view showing a bearing, a heat insulating member and a C-shaped ring.

As showing in FIG. 4, both end portions 21 of the core metal 12a of the fixing roller 12 are made to be smaller in outer diameter than a center portion. The end portion 21 has a large diameter portion 21a and a small diameter portions 21b having a smaller outer diameter than the large diameter portion 21a. The small diameter portion 21b is formed at an outside of the large diameter portion 21a in an axial direction of the fixing roller 12. Around a tip end portion of the small diameter portion 21b, a circumferential groove 21c is formed.

The small diameter portions 21b of the both end portions 21 of the fixing roller 12 are supported by front and rear side plates of the fixing roller storage recess 11c by bearings 25 in a rotatable manner. Between the small diameter portion 21b and the bearing 25, a heat insulating member 27 is interposed. The heat insulating member 27 is prevented from being pulled out from the small diameter portion 21b by a C-shaped ring 29 as an example of a pull-out prevention member.

Figure 5:
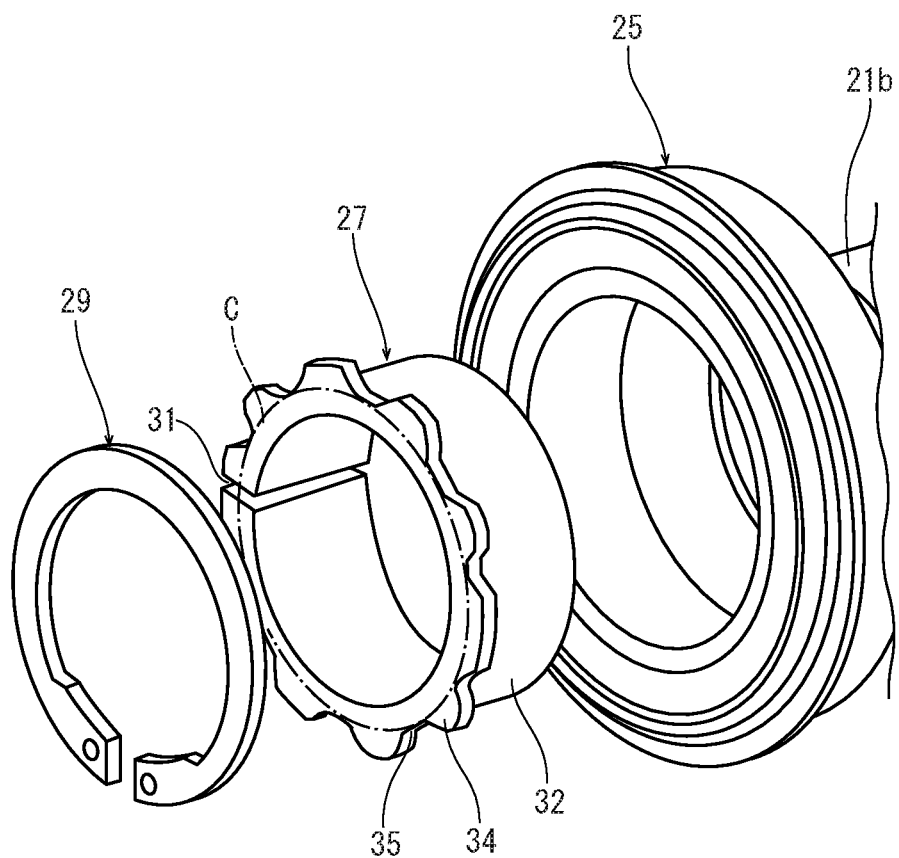
FIG. 5 is a perspective view showing a bearing, a heat insulating member and a C-shaped ring, in the fixing device according to the embodiment of the present disclosure.

As shown in FIG. 5, the heat insulating member 27 has a cylindrical part 32 and a flange part 34. The cylindrical part 32 has a slitting groove 31 extending along its axial direction. The flange part 34 extends outward in a radial direction of the cylindrical part 32 from one end of the cylindrical part 32 in the axial direction. The cylindrical part 32 has an inner diameter smaller than the outer diameter of the large diameter portion 21a of the end portion 21 of the fixing roller 12, and is capable of being fitted around the small diameter portion 21b. Along an outer circumferential edge of the flange part 34, a plurality of notches 35 (for example, ten notches) are formed at predetermined equal intervals in a circumferential direction of the cylindrical part 32. Each notch 35 has an approximately trapezoid shape whose width in the circumferential direction becomes narrow in its depth direction. The heat insulating member 27 is made of high heat insulating resin.

The C-shaped ring 29 has an outer diameter (shown by a two-dotted line in FIG. 5) smaller than an inscribed circle C of the notches 35 of the flange part 34 of the heat insulating member 27. The inner inscribed circle C is a circle which passes the deepest point of each notch 35 around a center of the cylindrical part 32.

The heat insulating member 27 is fitted around the small diameter portion 21b with the cylindrical part 32 inside and the flange part 34 outside in the axial direction of the fixing roller 12. The cylindrical part 32 is interposed between the small diameter portion 21b and the bearing 25, and an outer face of the bearing 25 comes into contact with the flange part 34. This positions the heat insulating member 27 with respect to the bearing 25. After the heat insulating member 27 is interposed, the C-shaped ring 29 is engaged with the circumferential groove 21c of the small diameter portion 21b. Thereby, the heat insulating member 27 is prevented from being pulled out from the small diameter portion 21b. Additionally, the heat insulating member 27 is slid along the small diameter portion 21c between the C-shaped ring 29 and the large diameter portion 21a.

With reference to FIG. 4 again, on the rear small diameter portion 21b of the fixing roller 12, a driven gear 38 is fixed at an outside of the heat insulating member 27 in the axial direction. The driven gear 38 is meshed with a drive gear 39a of a motor 39. When the motor 39 is operated, the driven gear 38 is rotated in a direction opposite to a rotating direction of the drive gear 39a to rotate the fixing roller 12 in the counterclockwise direction in FIG. 3. Alternatively, the pressing roller 13 may be driven to be rotated.

In the fixing device 6 having the above described configuration, when the fixing operation is started, the motor 39 drives the fixing roller 12 to rotate the fixing roller 12 and then the pressing roller 13 is driven by the fixing roller 12 to be rotated. The halogen heater 14 is activated to heat the fixing roller 12. When the fixing roller 12 is heated to a predetermined temperature, the sheet S is conveyed to the fixing nip N. At the fixing nip N, the toner image transferred on the sheet S is heated by the heated fixing roller 12 and pressed by the pressing roller 13 to be fixed on the sheet S.

The fixing roller 12 is rotated at a high speed during the fixing operation and at a low speed during a waiting period. After the fixing operation is finished, the activation of the halogen heater 14 is stopped and the fixing roller 12 is therefore cooled. By the heating and cooling, the fixing roller 12 expands or shrinks to vary the outer diameter of the end portion 21 of the core metal 12a. Following the variation of the outer diameter of the end portion 21, an outer diameter of the heat insulating member 27 is enlarged or reduced in a direction in which a width of the slitting groove 31 becomes wide or narrow.

As described above, according to the fixing device 6 of the present disclosure, the notches 35 are formed along the outer circumferential edge of the flange part 34 of the heat insulating member 27 so that the circumferential rigidity of the cylindrical part 32 is decreased and the force for fastening the end portion 21 of the fixing roller 12 by the heat insulating member 27 is therefore weakened. Accordingly, friction generated at relative sliding of the heat insulating member 27 to the end portion 21 becomes so weak that an occurrence of an abnormal noise is prevented. Additionally, a contact area between the flange part 34 of the heat insulating member 27 and the bearing 25 is decreased so that twisting force acting on the heat insulating member 27 when the heat insulating member 27 is slid with respect to the bearing 25 can be decreased. This makes it possible to rotate the heat insulating member 27 smoothly.

The plurality of notches 35 are formed along the outer circumferential edge of the flange part 34 at equal intervals so that the rigidity of the cylindrical part 32 can be decreased evenly in the circumferential direction. Accordingly, the cylindrical part 32 expands or shrinks smoothly to prevent a deviation of the fastening force.

The C-shaped ring 29 has the outer diameter smaller than the inscribed circle C of the notches 35 of the flange part 34. That is, a rotation orbit of an outer circumference of the C-shaped ring 29 is formed on an inside of the inscribed circle C. Accordingly, when the heat insulating member 27 is rotated with respect to the C-shaped ring 29, both ends of the C-shaped ring in the circumferential direction are prevented from being caught by the notches 35.

Figure 6:
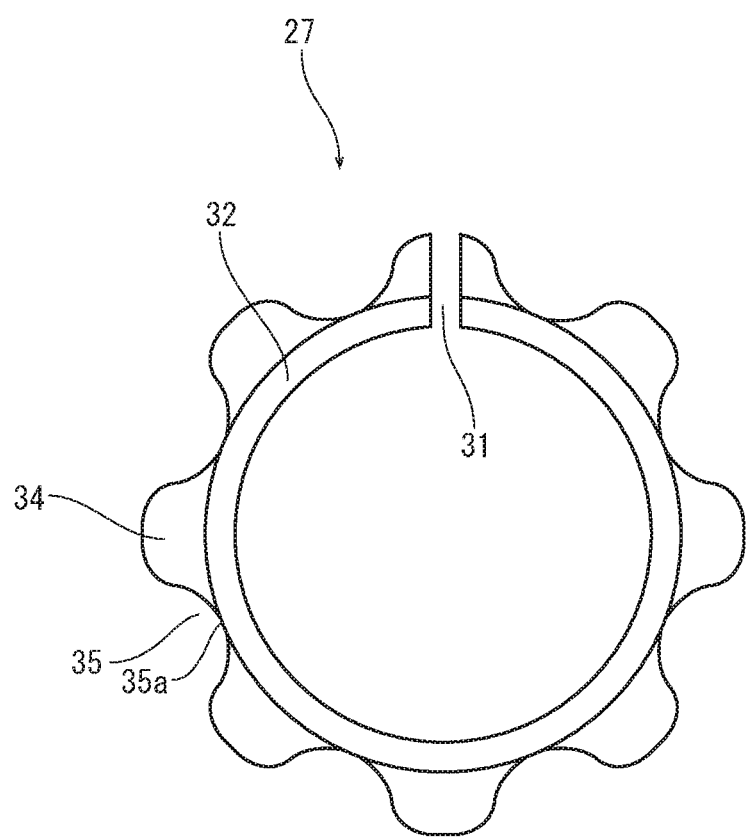
FIG. 6 is a front view showing the heat insulating member of a first modified example, in the fixing device according to the embodiment of the present disclosure.

Next, the heat insulating member 27 of a first modified example will be described with reference to FIG. 6. FIG. 6 is a front view showing the heat insulating member of the first modified example.

In the first modified example, the notches 35 of the flange part 34 are formed such that their deepest portions reach an outer circumferential face of the cylindrical part 32. That is, the notch 35 has a depth deeper compared with the above described embodiment. By the deeper depth of the notches 35, the circumferential rigidity of the cylindrical part 32 is further decreased so that the fastening force of the cylindrical part 32 can be further decreased. Accordingly, the occurrence of the abnormal noise can be inhibited surely.

Figure 7A:
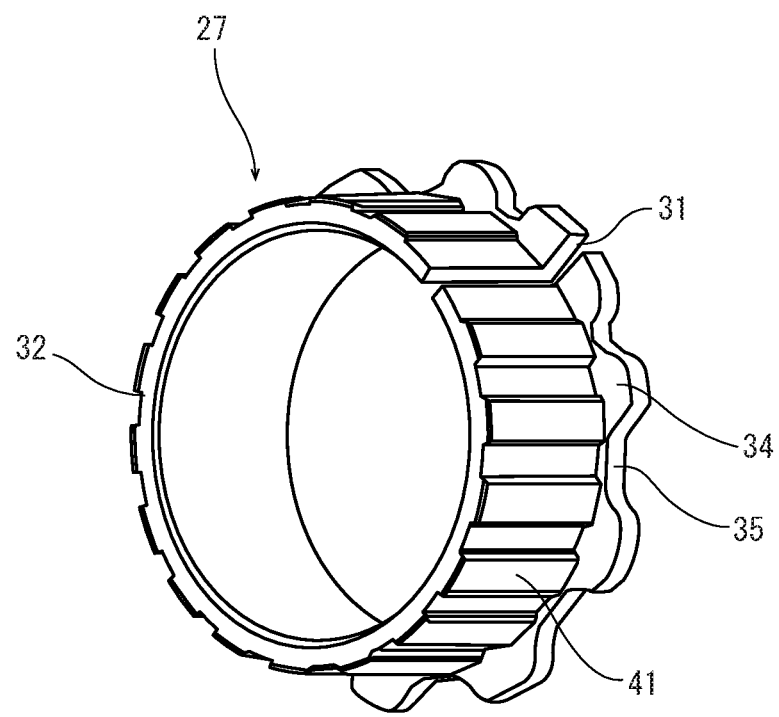
FIG. 7A is a perspective view showing the heat insulating member of a second modified example, in the fixing device according to the embodiment of the present disclosure.

Next, the heat insulating member 27 of a second modified example will be described with reference to FIG. 7A and FIG. 7B. FIG. 7A is a perspective view showing the insulating member of the second example and FIG. 7B is a sectional view showing a protrusion.

In the second example, as shown in FIG. 7A, around the outer circumferential face of the cylindrical part 32, a plurality of protrusions 41 extending along the axial direction are formed at predetermined intervals in the circumferential direction. The protrusion 41 has a shallow rectangular sectional face. Both outer corners of the protrusion 41 are chamfered. By forming the protrusions 41 around the circumferential face of the cylindrical part 32, friction between the heat insulating member 27 and the bearing 25 is decreased so that the heat insulating member 27 can be rotated smoothly.

When the circumferential face of the cylindrical part 32 is applied with a grease, a space between the adjacent arranged protrusions 41 forms a grease reservoir so that an application irregularity of the grease is hardly occurred.

Figure 7B:
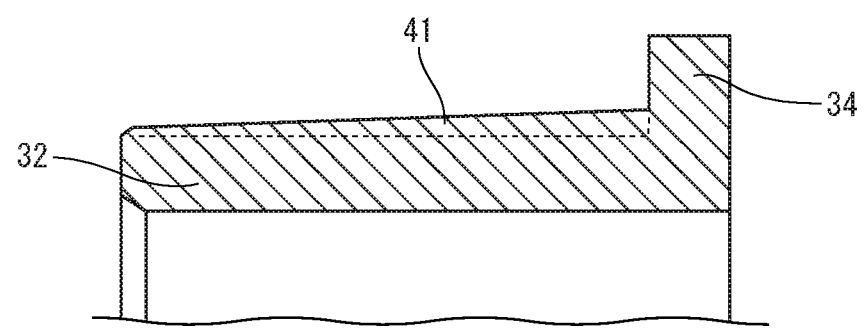
FIG. 7B is a sectional view showing a protrusion of the heat insulating member of the second modified example, in the fixing device according to the embodiment of the present disclosure.

In the second modified example, as shown in FIG. 7B, the protrusion 41 may be made higher toward the flange part 34. In this case, because the contact area between the cylindrical part 32 and the bearing 25 is further decreased, the friction between the bearing and the heat insulating member 27 may be further decreased.

A number of the notches 35 of the flange part 34 may be one. However, a plurality of notches 35 are preferable because an effect for decreasing the circumferential rigidity of the cylindrical part 32 is more improved. The notch 35 is formed into not only the trapezoid shape but also a U-shape or a V-shape.

While the preferable embodiment and its modified example of the fixing device and the image forming apparatus of the present disclosure have been described above and various technically preferable configurations have been illustrated, a technical range of the disclosure is not to be restricted by the description and illustration of the embodiment. Further, the components in the embodiment of the disclosure may be suitably replaced with other components, or variously combined with the other components. The claims are not restricted by the description of the embodiment of the disclosure as mentioned above.

The invention claimed is:

1. A fixing device comprising:
   a cylindrical fixing member heated by a heat source;
   a pressing member which forms a fixing nip between the pressing member and the fixing member;
   a bearing which supports an end portion of the fixing member in a rotatable manner; and
   a heat insulating member interposed between the bearing and the end portion of the fixing member,
   wherein the heat insulating member has
      a cylindrical part having a slitting groove extending along an axis direction of the cylindrical part, and
      a flange part extending outward in a radial direction of the cylindrical part from one end of the cylindrical part in the axis direction,
   wherein a plurality of notches are formed along an outer circumferential edge of the flange part at equal intervals in a circumferential direction of the flange part.

2. The fixing device according to claim 1,
   wherein the bearing comes into contact with the flange part of the heat insulating member in the axis direction.

3. The fixing device according to claim 1, comprising a C-shaped pull-out prevention member which comes into contact with the flange part of the heat insulating member at an opposite side to the bearing and prevents the heat insulating member from being pulled out from the end portion of the fixing member,
   wherein the pull-out prevention member has an outer diameter smaller than a diameter of a circle passing the deepest point of each of the plurality of notches around a center of the cylindrical part.

4. The fixing device according to claim 1,
   wherein the deepest portion of each of the plurality of notches reaches an outer circumferential face of the cylindrical part.

5. The fixing device according to claim 1,
wherein the cylindrical part has a plurality of protrusions along the axis direction with predetermined intervals in the circumferential direction.

6. The fixing device according to claim 5,
wherein each of the plurality of protrusions is made to be higher toward the flange part.

7. The fixing device according to claim 1,
wherein each of the plurality of notches is formed in a trapezoid shape, a U-shape, or a V-shape whose width in the circumferential direction of the outer circumferential edge becomes narrow in a depth direction.

8. The fixing device according to claim 1,
wherein the heat insulating member is slid along the end portion of the fixing member.

9. An image forming apparatus comprising:
an image forming part which forms a toner image on a sheet, and
the fixing device according to claim 1, which fixes the toner image on the sheet.

\* \* \* \* \*